United States Patent
Dhandapani et al.

(10) Patent No.: US 9,164,861 B2
(45) Date of Patent: Oct. 20, 2015

(54) DRIVE MAPPING USING A PLURALITY OF CONNECTED ENCLOSURE MANAGEMENT CONTROLLERS

(75) Inventors: Kayalvizhi Dhandapani, Suwanee, GA (US); Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 941 days.

(21) Appl. No.: 13/240,918

(22) Filed: Sep. 22, 2011

(65) Prior Publication Data

US 2013/0080697 A1 Mar. 28, 2013

(51) Int. Cl.
*G06F 13/00* (2006.01)
*G06F 13/28* (2006.01)
*G06F 11/30* (2006.01)
*G06F 11/32* (2006.01)

(52) U.S. Cl.
CPC ........ *G06F 11/3034* (2013.01); *G06F 11/3055* (2013.01); *G06F 11/325* (2013.01); *G06F 11/3065* (2013.01); *G06F 11/3093* (2013.01)

(58) Field of Classification Search
CPC . G06F 3/0689; G06F 11/3034; G06F 11/325; G06F 11/3055; G06F 11/3093; G06F 11/3065
USPC ................. 711/114, E12.002; 713/1; 710/19
See application file for complete search history.

(56) References Cited

U.S. PATENT DOCUMENTS

| 7,450,027 | B1 * | 11/2008 | Overby ..................... 340/815.4 |
| 7,613,843 | B1 * | 11/2009 | Dhandapani et al. ............. 710/8 |
| 2008/0005408 | A1 * | 1/2008 | Yen et al. ......................... 710/58 |
| 2012/0159029 | A1 * | 6/2012 | Krishnan et al. .............. 710/301 |

OTHER PUBLICATIONS

Byte Paradigm, "Introduction to I2C and SPI Protocols", retreived on Aug. 20, 2014.*
Rokov, Steve, "Making IPMI Work in ATCA Designs", Nov. 10, 2004.*

* cited by examiner

*Primary Examiner* — Edward Dudek, Jr.
(74) *Attorney, Agent, or Firm* — Locke Lord LLP; Tim Tingkang Xia, Esq.

(57) ABSTRACT

According to one aspect, a computing system having a plurality of enclosure management controllers (EMCs) is disclosed. In one embodiment, the EMCs are communicatively coupled to each other and each EMC is operatively connected to a corresponding plurality of drive slots and at least one of a plurality of drive slot status indicators. Each EMC is operative to receive enclosure management data, detect an operational status of the drive slots, and generate drive slot status data. One of the EMCs is configured to function at least partly as a master EMC to receive drive slot status data and, based on received enclosure management data and received drive slot status data, generate mapped data for each one of the EMCs for selectively activating at least one of the drive slot status indicators to indicate corresponding operational status.

20 Claims, 4 Drawing Sheets

DRIVE MAPPING USING A PLURALITY OF CONNECTED ENCLOSURE MANAGEMENT CONTROLLERS

FIELD OF THE INVENTION

The present invention generally relates to managing functions of mass storage devices in computing systems, and more particularly to drive mapping using a plurality of communicatively connected enclosure management controllers.

BACKGROUND OF THE INVENTION

An enclosure management controller (EMC), also commonly referred to as a backplane controller, can be used with a storage backplane to decode protocol information in management information coming from a host bus adapter (HBA)/RAID controller. The EMC can manage drive slots on the storage backplane based on the protocol information. For example, the EMC can manage status indicator LEDs corresponding to the drive slots. An EMC may control 4-8 drive slots using side-band communication carrying SGPIO, SES, SAF-TE, or custom user-defined protocol. Serial interfaces can be used to carry management information associated with drive slots that connect mass storage devices to the storage backplane. Multiple motherboards may be required in order to provide for control of a large number of drive slots, for example in the context of cloud computing. Among other existing needs, there exists a need for a flexible architecture allowing multiple connected EMCs to each control multiple drive slots, without requiring all of the EMCs to be connected to motherboards in order to receive enclosure management data.

Therefore, a heretofore unaddressed need still exists in the art to address the aforementioned deficiencies and inadequacies.

SUMMARY OF THE INVENTION

By practicing one or more aspects of the present invention disclosed herein in various exemplary embodiments, a highly configurable and flexible computing architecture provides for multiple EMCs to be communicatively connected to each other, wherein each of the EMCs may control multiple drive slots on a storage backplane without requiring for all of the EMCs to be connected to motherboards to receive enclosure management data. In one or more of the various exemplary embodiments of the present invention disclosed herein, one EMC is configured to function as a master EMC to collect enclosure management data from other connected EMCs functioning as slaves. The master EMC may also simultaneously function as a slave and is operable to communicate with the other slave devices and to map the enclosure management data depending on the number of connected motherboards present. The master EMC is operable to send the mapped data to the slave EMCs, where the master EMC and the slave EMCs use the mapped data to drive the operation of drive slot status indicators on the storage backplane, instead of driving the indicators directly from the enclosure management data.

In one aspect, the present invention relates to a computing system. In one embodiment, the computing system includes a plurality of enclosure management controllers (EMCs) communicatively connected to each other via a communications link. Each EMC is operatively connected to a corresponding plurality of drive slots and at least one of a plurality of drive slot status indicators. Each EMC is operative to perform functions that include receiving enclosure management data, detecting an operational status of each of the drive slots, and generating drive slot status data indicating the detected operational status of each of the drive slots. One of the EMCs is configured to function at least partly as a master EMC and is further operative to perform functions that include receiving drive slot status data and, based on the received enclosure management data and drive slot status data, generating mapped data for each one of the EMCs for selectively activating at least one of the drive slot status indicators to indicate the operational status of at least one of the drive slots.

In one embodiment, the enclosure management data received by the EMC functioning at least partly as a master EMC includes enclosure management data associated with the other EMCs.

In one embodiment, the drive slot status data received by the EMC functioning at least partly as a master EMC is received via the communications link from the other EMCs and includes a detected operational status of at least one of the drive slots operatively connected to a corresponding at least one of the other EMCs.

In one embodiment, each of the drive slots is configured to be operatively coupled to a mass storage device.

In one embodiment, detecting the operational status of each of the drive slots includes determining at least one of the location of a mass storage device, whether a mass storage device is mated to a drive slot, and, if a mass storage device is mated to the drive slot, whether the mated mass storage device is active.

In one embodiment, at least one of the EMCs is communicatively connected to a corresponding at least one management microcontroller and is operative to receive enclosure management data from the corresponding at least one management microcontroller.

In one embodiment, the function of generating the mapped data includes generating mapped drive slot status data for each one of the EMCs, and the EMC configured to function at least partly as a master EMC is further operative to provide the mapped drive slot status data for at least one of the EMCs to the at least one management microcontroller.

In one embodiment, the corresponding at least one management microcontroller is configured to function as a baseboard management controller (BMC).

In one embodiment, the at least one EMC communicatively connected to the corresponding at least one management microcontroller is connected via an SGPIO bus or a system management bus (SMBus).

In one embodiment, the communications link includes an SPI bus.

In one embodiment, the drive slot status indicators include light emitting diodes (LEDs) and selectively activating a drive slot status indicator includes causing at least one of the LEDs to emit visible light.

In another aspect, the present invention relates to a master enclosure management controller (EMC) in a computing system. The computing system includes a plurality of enclosure management controllers (EMCs) that are each communicatively connected to each other via a communications link. Each of the plurality of EMCs is operatively connected to a corresponding plurality of drive slots and also to at least one corresponding drive slot status indicator. In one embodiment, the master EMC is operative to perform functions that include receiving enclosure management data, detecting an operational status of each of the corresponding drive slots, and generating drive slot status data indicating the detected operational status of each of the corresponding drive slots. The master EMC is also operative to perform functions that include receiving drive slot status data and, based on the received enclosure management data, generated drive slot data, and received drive slot status data, generating mapped data for each one of the EMCs for selectively activating at least one drive slot status indicator to indicate the operational status of at least one of the drive slots.

In one embodiment, the master EMC is further operative to receive enclosure management data that includes data associated with the other EMCs.

In one embodiment, the master EMC is further operative to receive drive slot status data that includes a detected operational status of at least one drive slot of each of the other EMCs, via the communications link from the other EMCs.

In one embodiment, each of the drive slots is configured to be operatively coupled to a mass storage device.

In one embodiment, the drive slot status data includes information associated with at least one of the location of a mass storage device, whether a mass storage device is mated to a drive slot, and, if a mass storage device is mated to the drive slot, whether the mated mass storage device is active.

In one embodiment, the received enclosure management data includes enclosure management data from at least one management microcontroller that is communicatively connected to a corresponding at least one of the EMCs.

In one embodiment, the communications link includes an SPI bus.

In one embodiment, generating the mapped data comprises generating mapped drive slot status data for each one of the EMCs, and the master EMC is further operative to provide the mapped drive slot status data for at least one of the EMCs to the at least one management microcontroller.

In yet another aspect, the present invention relates to a computer-readable medium. The computer-readable medium has stored instructions which, when executed by a processor in a computing system, cause enclosure management controllers (EMCs) to perform specific functions. The computing system includes a plurality of EMCs that are communicatively connected to each other via a communications link. Each EMC is operatively connected to a corresponding plurality of drive slots and also to at least one corresponding drive slot status indicator. When executed by a processor, the stored computer-executable instructions cause each EMC to perform functions that include receiving enclosure management data, detecting an operational status of each of the drive slots, and generating drive slot status data indicating the detected operational status of each of the drive slots. The computer-readable medium also has stored instructions which, when executed by a processor, cause one of the EMCs to function at least partly as a master EMC and to further perform functions that include receiving drive slot status data and, based on the received enclosure management data and drive slot status data, generating mapped data for each one of the EMCs for selectively activating at least one drive slot status indicator to indicate the operational status of at least one of the drive slots.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. The description will be made as to the embodiments in conjunction with the accompanying drawings in FIGS. 1-4.

In one aspect, the present invention relates to a computing system. In the exemplary embodiment shown in FIG. 1, a plurality of communicatively connected EMCs include a master EMC and a plurality of slave EMCs. The computing system 100 includes a plurality of enclosure management controllers (EMCs) 110, 120, 130, and 140 that are communicatively connected to each other via a communications link 150. The communications link 150 in the exemplary embodiment shown in the exemplary embodiment of FIG. 1 has an SPI bus. The EMC 110 is configured to function as both a master EMC and also as a slave EMC, whereas the other EMCs 120, 130, and 140 function only as slave EMCs. The enclosure management data received by the master EMC 110 includes enclosure management data associated with the all of the EMCs 110, 120, 130, and 140. Now referring also to the exemplary embodiment shown in FIG. 2, each EMC is operatively connected to a corresponding plurality of drive slots 222A-222D, and each EMC is also connected to one or more of a plurality of drive slot status indicators 226A-226D, 228A, 228B, and 236A-236D.

Figure 1:
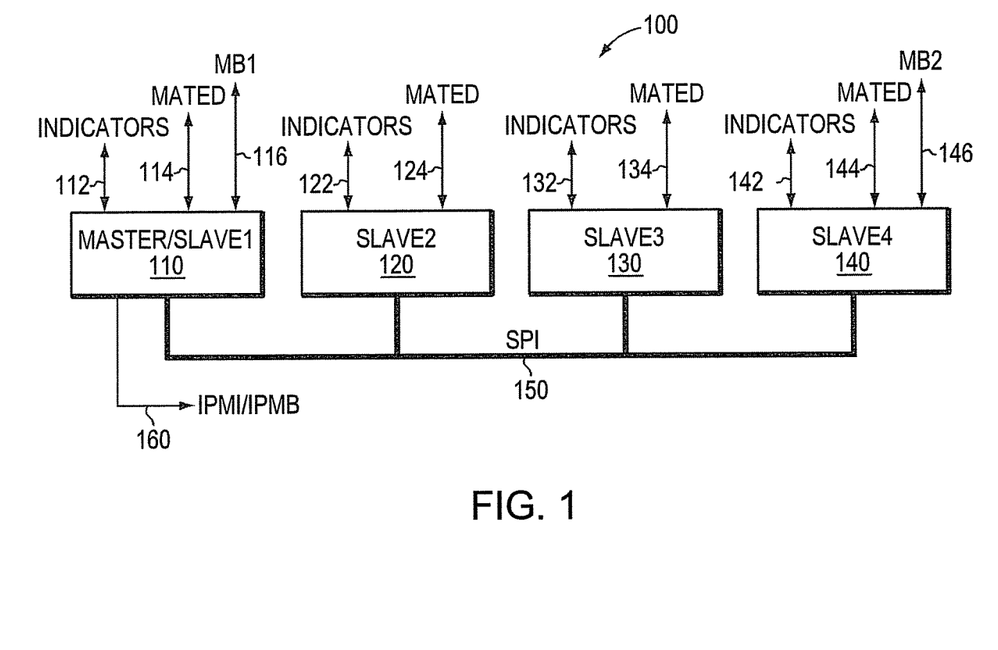
FIG. 1 schematically shows a plurality of communicatively connected enclosure management controllers (EMCs) including a master EMC and a plurality of slave EMCs, according to one exemplary embodiment of the present invention.

Each EMC is operative to perform functions that include receiving enclosure management data, detecting an operational status of each of the drive slots, and generating drive slot status data indicating the detected operational status of each of the drive slots. The master EMC, such as EMC 110 shown in the embodiment of FIG. 1, is operative to perform functions that include receiving drive slot status data and, based on the received enclosure management data and drive slot status data, generating mapped data for each one of the EMCs 110, 120, 130, and 140 for selectively activating at least one of the drive slot status indicators to indicate the operational status of at least one of the drive slots. In the exemplary embodiment shown in FIG. 1, each of the EMCs 110, 120, 130, and 140 have respective connections such as connector pins for operatively connecting the EMC to drive slot status indicators, via connections 112, 122, 132, and 142, labeled "Indicators", and for communicating connection data associated with the mated status, activity status, location status, and/or failed status of one or more mass storage devices that are operative for connection to respective drive slots, via connections 114, 124, 134, and 144, labeled "Mated." In the exemplary embodiment shown in FIG. 2, the drive slot status indicators 226A-226D, 228A, 228B, and 236A-236D include light emitting diodes (LEDs), and the function and selectively activating a drive slot status indicator includes illuminating at least one of the LEDs, that is, causing at least one of the LEDs to emit visible light.

Again referring to the exemplary embodiment shown in FIG. 1, the drive slot status data received by the EMC 110 is received via the communications link 150 from the other EMCs 120, 130, 140 and includes a detected operational status of one or more of the drive slots that are operatively connected to a corresponding one or more of the other EMCs 120, 130, 140. In the exemplary embodiment shown in FIG. 2, each of the drive slots 222A-222D is configured to be operatively coupled to a corresponding one of the mass storage devices 206A-206D. The function of detecting the operational status of each of the drive slots includes determining the location of a mass storage device and/or determining whether a mass storage device is mated to a drive slot, and, if a mass storage device is mated to the drive slot, determining whether the mated mass storage device is active.

As shown in FIG. 1, EMC 110 and EMC 140 are operative to communicatively connect to corresponding management microcontrollers, such as baseboard management controllers (BMCs) of motherboards, via connection 116 to a first motherboard MB1 (not shown) and via connection 146 to a second motherboard MB2 (not shown), with SGPIO and/or SES connections. The EMCs 110 and 140 are operative to receive enclosure management data from the corresponding motherboards MB1 and MB2, respectively. In the exemplary embodiment shown in FIG. 2, the EMC 224 is connected to the management microcontroller 244, shown as a BMC 244 of a motherboard 258, via a communications link 256 such as an I2C link for operative to communicate IPMI/IPMB protocol data. Further, the EMC 224 is operative to communicatively connect to other EMCs (not shown), for example slave EMCs as discussed above with reference to the exemplary embodiment of FIG. 1, over an SPI bus 234 and via an interface 232 on the EMC 224 and an interface 252 on the storage backplane 204.

The function of generating mapped data, performed by the master EMC 110, includes generating mapped drive slot status data for each of the EMCs 110, 120, 130, and 140. The EMC 110 is further operative to provide the generated mapped drive slot status data for one or more of the EMCs 110, 120, 130 and/or 140 to one or more of the motherboards MB1 and MB2. It should be appreciated that each of the EMCs 110, 120, 130, and 140 may each be configured to operatively connect to more than four drive slots, such as in a configuration having each of the four EMCs 110, 120, 130, and 140 connected to eight drive slots on respective storage backplanes. Thus, up to thirty-two drive slots may be operatively connected using only one master EMC. Further, it should be appreciated that only one motherboard is needed for communicating enclosure management data for all of the connected EMCs, but the functional aspects of various embodiments of the present invention may be practiced with one motherboard for each of the EMCs.

Figure 2:
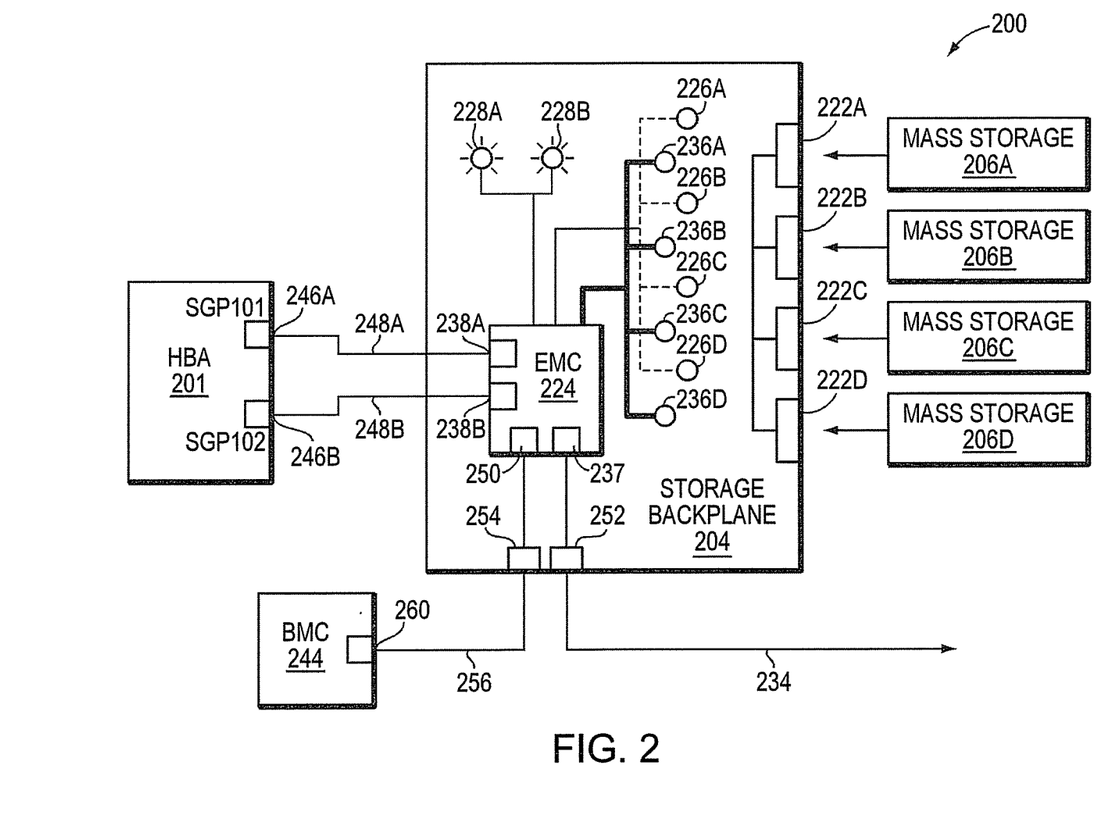
FIG. 2 schematically shows an EMC on a storage backplane, connected to a corresponding motherboard, drive slots, and drive slot status indicators, according to one exemplary embodiment of the present invention.

Now specifically referring to the exemplary embodiment shown in FIG. 2, a computing system 200 includes an EMC 224 on a storage backplane 204 that is connected to a corresponding management microcontroller 244, to drive slots 222A-222D, and to drive slot status indicators 226A-226D, 228A, 228B, and 236A-236D. A host bus adapter (HBA) 201 has interfaces 246A, 246B for exchanging enclosure management data between the HBA 201 and the storage backplane 204 and over respective communication links 248A and 246B to corresponding interfaces 238A and 238B of the EMC 224. As shown, the HBA 201 is equipped with serial general purpose input/output (SGPIO) interfaces 246A (SGPIO1) and 246B (SGPIO2). The HBA 201 may be a SATA/SAS compatible HBA providing a communication bus to exchange data between the storage backplane 204 and the EMC 224. An I2C interface 260 on the BMC 244 of the motherboard 258 provides for communication with the storage backplane 204 over the communications link 256, and to the EMC 224 via interface 254 on the storage backplane 204 and interface 250 on the EMC 224. It should be appreciated that the particular physical interfaces described herein for exchanging management information with the backplane are merely illustrative and that any physical communications link suitable for transmitting management data may be utilized with the various exemplary embodiments presented herein. The BMC 244 may also support multiple enclosure management interfaces and protocols, such as IPMI/IPMB.

One or more cables may be utilized to connect the SGPIO ports 246A, 246B of the HBA 201 to the storage backplane 204. Alternatively, a multilane cable may be utilized to connect the individual ports on the HBA 201 to a single multilane connector on the storage backplane 204. It should also be appreciated that HBAs with other port configurations may be utilized. According to various embodiments, the storage backplane 204 and the EMC 224 may be configured to receive enclosure management information on multiple interfaces. The EMC 224 is operative to communicatively connect to other EMCs (not shown), for example slave EMCs as discussed above with reference to the exemplary embodiment of FIG. 1, over an SPI bus 234 and via an interface 232 on the EMC 224 and an interface 252 on the storage backplane 204

As shown, the storage backplane 204 provides drive slots 222A-222D with connectors for interfacing with one or more mass storage devices 206A-206D, such as SAS or SATA hard disk drives. In one or more embodiments, the storage backplane 204 may be mounted within an enclosure such that the mass storage devices 206A-206D can slide into slots within the enclosure. Aligned within such enclosure slots, the mass storage devices 206A-206D are operative to mate directly with the appropriate connector for each of the drive slots 222A-222D. The storage backplane 204 provides circuitry for routing signals between the drive slots 222A-222D and the HBA 201 such that the storage backplane 204 supports communication between the HBA 201 and the connected mass storage devices 206A-206D. The connectors for the drive slots 222A-222D in the exemplary embodiment shown in FIG. 2 have receptacle connectors for the mass storage devices 206A-206D.

The EMC 224 is operative to receive data from the HBA 201 instructing it to illuminate one of the drive slot status indicators 226A-226D, shown here as LEDs, for locating a particular one of the mass storage devices 206A-206D. The EMC 224 is further operative to illuminate the drive slot status indicators 226A-226D to indicate activity on the mass storage devices 206A-206D, or to indicate that one of the mass storage devices 206A-206D is being rebuilt. The drive slot status indicators 236A-236D are operative to be illuminated by the EMC 224 to indicate that one of the mass storage devices 206A-206D has failed. Drive slot status indicators 128 and 130 are operative to be illuminated to provide a global indication that one of the mass storage devices 206A-

206D on the storage backplane 204 is active or has failed. The EMC 224 is further operative to provide information to the BMC 244. For instance, the EMC 224 may provide data to the HBA 201 to indicate whether a particular drive is mated to the enclosure management backplane 204. It should be appreciated that although these status indicators have been illustrated and described herein primarily as LEDs, other types of visual, audible, or haptic indicators may be utilized to provide indications of mass storage device state and status to a user. In addition to illuminating an LED, providing a status indication may alternatively include terminating or extinguishing an indicator, selectively flashing or otherwise modulating an indicator, or combinations thereof.

Figure 3:
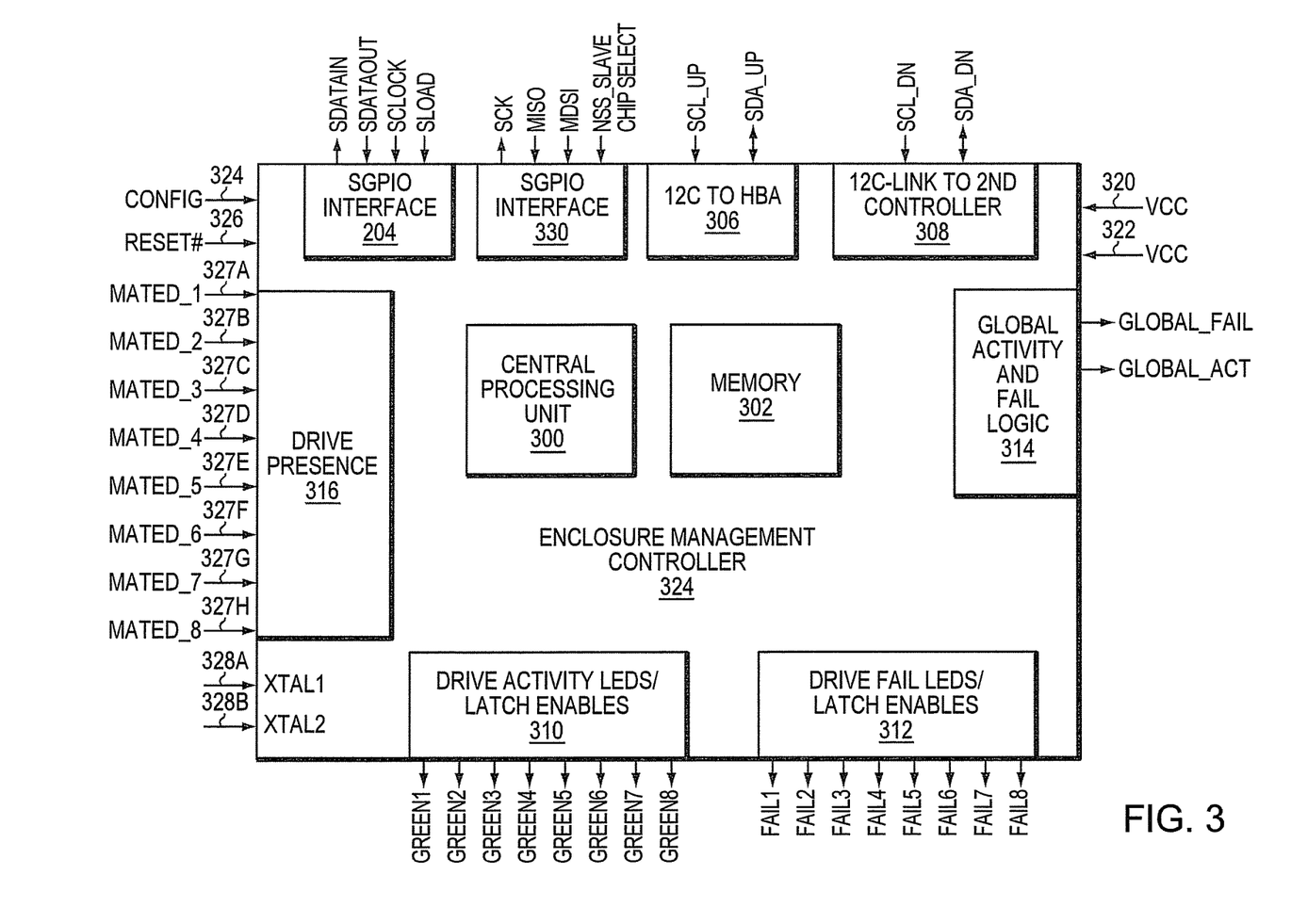
FIG. 3 schematically shows detailed aspects of an EMC according to one or more exemplary embodiments of the present invention.

Now referring specifically to FIG. 3, a functional block diagram illustrates aspects of an EMC 324 according to one or more exemplary embodiments of the present invention. As shown, the EMC 324 has a CPU 300 and a memory 302. The CPU 300 is operative to control the overall operation of the EMC 324. The CPU 300 is further operative to utilize the memory 302 during the performance of its processing functions. It should be appreciated that although the EMC 324 is described herein as a programmable microcontroller including a CPU 300 and memory 302, the embodiments presented herein may also be implemented utilizing a general purpose computer, a custom application specific integrated circuit (ASIC), a field-programmable gate array (FPGA) device, or any other type of IC or computing mechanism known to those skilled in the art.

The EMC 324 is equipped with multiple physical interfaces for communicating management data. As shown, the EMC 324 includes a SGPIO interface 304 for communicating management data with SAS-equipped HBAs or other types of SAS initiators. The SGPIO interface 304 supports four signals: serial data output (SDATAOUT), serial data input (SDATAIN), clock (SCLOCK), and a framing signal (SLOAD). An SPI interface 330 supports four signals: serial clock (SCK), master-in, slave-out (MISO), master-out, slave-in (MOSI) and reset out (RST1). When utilized in an embodiment of communicatively connected devices including a master device and slave devices, the SPI interface 330 supported signals correspond as follows: SCK refers to an output from master and input to slave, MISO is an output from slave and an input to master, MOSI is an output from master and an input to slave, and RST1 is a reset out from master to slave1 in master mode. Using these signals, the EMC 324 is operative to receive information regarding the status of connected mass storage devices, such as data indicating whether a mass storage device is active, failed, or otherwise. Using the signals for the SPI interface 330, the EMC 324 is operative to communicate data with other communicatively connected EMCs. An I2C interface 306 is provided for communicating enclosure management data with a BMC or system management bus (SMBus). The I2C interface 306 is operative to support two signals: a serial clock line (SCL-UP), and a serial data line (SDA-UP). A downstream interface 308 provides for connection to a downstream I2C device. In one embodiment, an HBA such as HBA 201 shown in FIG. 2 may communicate with the EMC 324 over a private I2C bus. The SCSI enclosure services (SES) protocol may be utilized for this communication. The I2C or SGPIO bus can be routed to the enclosure management backplane 304 through a cable.

The EMC 324 includes circuitry for generating output signals to drive a visual or audible indicator. For instance, an output module 310 is provided for illuminating LEDs or other types of activity indicators when one or more of the connected hard disk drives are active. An output module 312 is operative for driving LEDs when one or more of the connected hard disk drives has failed. It should be appreciated that a separate output may be provided for driving an individual LED to indicate the activity or failure of each hard disk drive. Circuitry 314 is provided for driving indicators related to global activity and global failure. It should be appreciated that these outputs may be configured to either drive an LED directly or to connect to an upstream backplane controller. In this manner, the activity and failure of drives connected to one EMC 324 may be communicated to one or more additional upstream EMCs. In the embodiment shown, the outputs of the output modules 310 and 312 are operative as latch enables to drive external latches and thereby illuminate a larger quantity of LEDs or other indicators.

The EMC 324 further provides an input 320 for receiving an appropriate voltage for powering the operation of the EMC 324. According to one or more embodiments, this voltage is approximately 5 volts or 3.3 volts. A ground connection 222 is provided as a power return. The EMC 324 is further equipped with inputs 328A, 328B for receiving an appropriate clock signal, an input 344 for enabling a configuration of the EMC 324, and a reset input 346 for resetting operation of the EMC 324.

The EMC 324 has pins 327A-327H connected to a drive presence circuit 316. The drive presence circuit 316 is operative to detect the presence of a mass storage device. According to one or more embodiments, the drive presence circuit 316 has an analog-to-digital converter (ADC) for detecting the voltage on the pins 327A-327H. Based on the detected voltage, the drive presence circuit 316 is operative to determine whether a mass storage device has been connected. Each of the pins 327A-327H are operative for conveying information regarding the mated status of a single respective mass storage device.

According to one or more embodiments, the pins 327A-327H and the drive presence circuit 316 are configured to detect the activity of a mass storage device. In this regard, the EMC 324 is operative to determine, based on the voltage detected at each of the pins 327A-327H, whether a mass storage device associated with each of the pins 327A-327H is active. In this manner, a single one of the pins 327A-327H of the EMC 324 is operative for determining the mated status of a mass storage device and whether a connected mass storage device is active or inactive. The EMC 324 may transmit data regarding the mated status of each mass storage device to an HBA, such as HBA 201 shown in the embodiment of FIG. 2, via the SGPIO interfaces 304A, 304B or the I2C interface 306.

Figure 4:
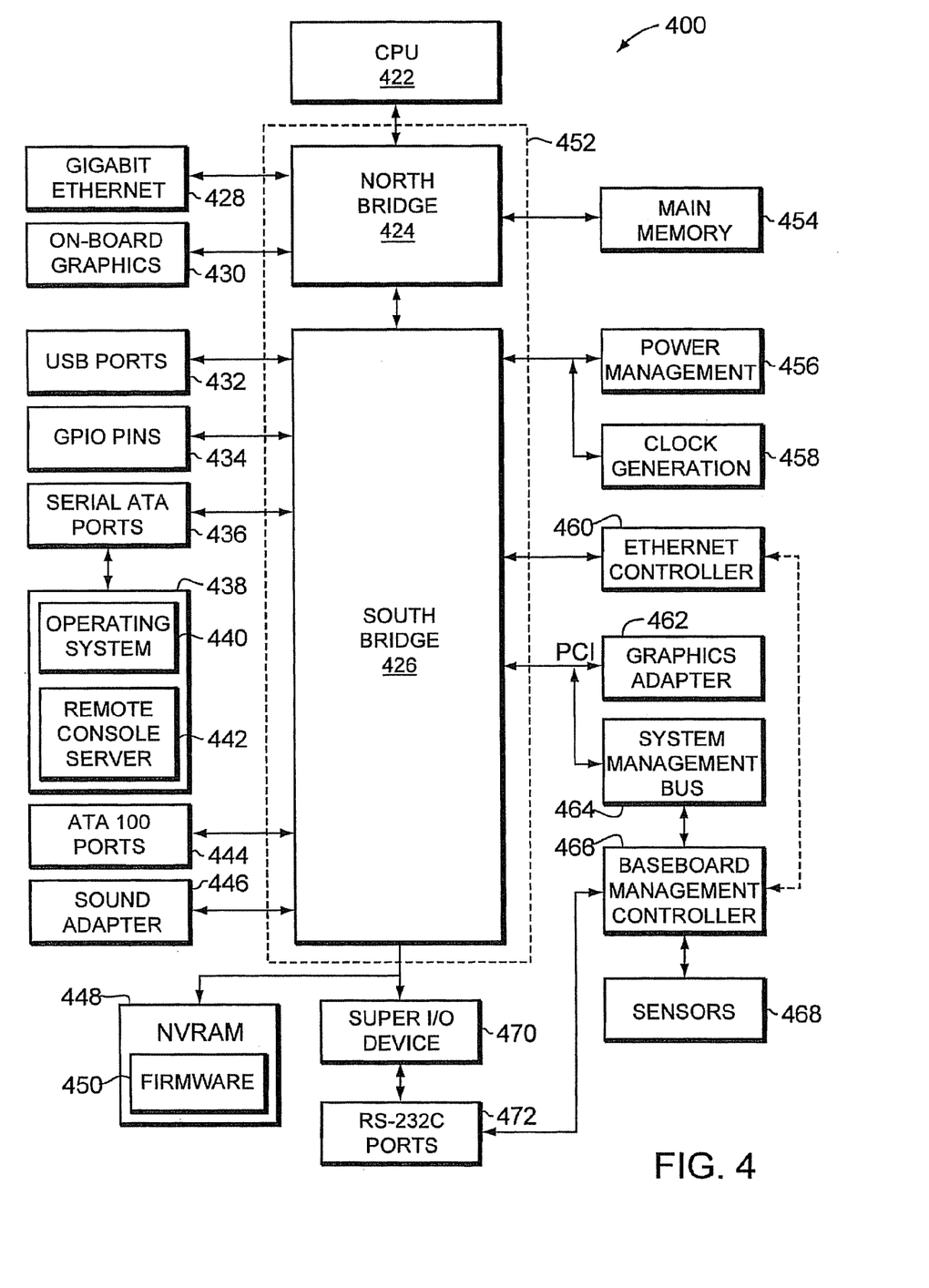
FIG. 4 schematically shows architecture of a computing system according to one or more exemplary embodiments of the present invention.

Now referring specifically to FIG. 4, a computer architecture is schematically shown for various computing systems utilized according to one or more exemplary embodiments of the present invention. The architecture shown in FIG. 4 corresponds to a computer 400 having a motherboard, which is a printed circuit board to which components or devices may be connected by way of a system bus or other electrical communication path. The computer 400 may be configured to function as a management microcontroller such as the host bus adapter (HBA) 244 described above with reference to FIG. 2.

As shown in FIG. 4, the computer 400 has a central processing unit ("CPU") 422 which operates in conjunction with a chipset 452. The CPU 422 is a standard central processor that performs arithmetic and logical operations necessary for the operation of the computer 400. The chipset 452 includes a north bridge 424 and a south bridge 426, wherein the north bridge 424 provides an interface between the CPU 422 and the remainder of the computer 400. The north bridge 424 also provides an interface to a random access memory ("RAM") used as the main memory 454 in the computer 400 and, optionally, to an onboard graphics adapter 440. The north bridge 424 may also include functionality for providing networking functions through a gigabit Ethernet adapter 428. The gigabit Ethernet adapter 428 is operative to connect the computer 400 to another computer via a network. Connections which may be made by the network adapter 428 include LAN or WAN connections. As shown, the north bridge 424 is connected to the south bridge 426.

The south bridge 426 is operative to control many of the input/output functions of the computer 400. In particular, the south bridge 426 may provide one or more universal serial bus ("USB") ports 442, an Ethernet controller 460, and one or more general purpose input/output ("GPIO") pins 444. The south bridge 426 may also provide a bus for interfacing peripheral card devices such as a graphics adapter 462. In one embodiment, the bus comprises a peripheral component interconnect ("PCI") bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an exemplary embodiment, the south bridge 426 includes a serial advanced technology attachment ("SATA") adapter for providing one or more serial ATA ports 446. The serial ATA ports 446 may be, in turn, connected to one or more mass storage devices such as a SATA disk drive 448, which store an operating system 440 and application programs 442. Those skilled in the art will recognize that an operating system 440 has a set of programs that control operations of a computer and allocation of resources. An application program is software that runs on top of the operating system software, or other runtime environment, and uses computer resources to perform application specific tasks desired by the user.

The mass storage devices connected to the south bridge 426, and their associated computer-readable media, provide non-volatile storage for the computer 400. Although the description of computer-readable media contained herein refers to a mass storage device such as a hard disk or CD-ROM drive, those skilled in the art will recognize that computer-readable media can be any available media that can be accessed by the computer 400. Computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400.

As described briefly above, the south bridge 426 may include a system management bus 464. The system management bus 464 may be operatively associated with a baseboard management controller (BMC) 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components such as a spindle motor, or CPU fan within the system, the voltage across or applied to one or more components within the system 400, and/or the available or used capacity of memory devices within the system 400. To accomplish these monitoring functions, the BMC 466 is communicatively connected to one or more components by way of the management bus 464. In one exemplary embodiment, these components include sensor devices 468 for measuring various operating and performance-related parameters within the computer system 400.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

It should be appreciated that the computer 400 may comprise other types of computing devices known to those skilled in the art. It is also contemplated that the computer 400 may not include all of the components shown in FIG. 4 and/or may include other components that are not specifically shown in FIG. 4.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A computing system comprising:
   a plurality of enclosure management controllers (EMCs) communicatively coupled to each other via a first communications link, wherein each EMC is communicatively connected to a corresponding plurality of drive slots and at least one of a plurality of drive slot status indicators, and wherein one of the EMCs is configured to function at least partly as a master EMC, and all of the EMCs not configured to function as the master EMCs are slave EMCs;
   wherein each EMC is operative to perform functions comprising:

(a) receiving the enclosure management data;
(b) detecting an operational status of each of the drive slots; and
(c) generating drive slot status data indicating the detected operational status of each of the drive slots,
and wherein the master EMC is further operative to perform functions comprising:
(d) receiving drive slot status data from the slave EMCs;
(e) based on the received enclosure management data and all of the drive slot status data, generating mapped data for each one of the EMCs for selectively activating at least one of the drive slot status indicators to indicate the operational status of at least one of the drive slots; and
(f) sending the mapped data for each of the slave EMCs to the corresponding slave EMCs, respectively.

2. The system of claim 1, wherein the enclosure management data received by the master EMC comprises enclosure management data associated with the slave EMCs.

3. The system of claim 1, wherein drive slot status data received by the master EMC is received via the first communications link from the slave EMCs and includes a detected operational status of at least one of the drive slots operatively connected to a corresponding at least one of the slave EMCs.

4. The system of claim 1, wherein each of the drive slots is configured to be operatively coupled to a mass storage device.

5. The system of claim 4, wherein detecting the operational status of each of the drive slots comprises determining at least one of:
(a) the location of a mass storage device;
(b) whether a mass storage device is mated to the drive slot; and
(c) if a mass storage device is mated to the drive slot, whether the mated mass storage device is active.

6. The system of claim 1, wherein at least one of the EMCs is communicatively connected to a storage controller configured to provide the enclosure management data to the EMCs wherein the storage controller is configured to function as at least one of a host bus adapter (HBA), a redundant array of independent disks (RAID) controller, a serial advanced SCSI (SAS) controller, and a serial advanced technology attachment (SATA) controller.

7. The system of claim 6, wherein generating the mapped data comprises generating mapped drive slot status data for each of the EMCs, and wherein the master EMC is further operative to communicate the enclosure management data with a baseboard management controller (BMC) over a second communications link.

8. The system of claim 7, wherein the second communications link is configured for IPMI-IPMB communications.

9. The system of claim 6, wherein each of the EMC being communicatively connected to the storage controller is connected thereto via a serial general purpose input/output (SGPIO) bus or a system management bus (SMBus).

10. The system of claim 1, wherein the first communications link comprises a serial peripheral interface (SPI) bus.

11. The system of claim 1, wherein the drive slot status indicators comprise light emitting diodes (LEDs) and selectively activating a drive slot status indicator comprises causing at least one of the LEDs to emit visible light.

12. A master enclosure management controller (EMC), in a computing system having a plurality of enclosure management controllers (EMCs) including the master EMC and one or more slave EMCs, wherein each of the EMCs is communicatively coupled to each other via a first communications link and each operatively connected to a corresponding plurality of drive slots and at least one corresponding drive slot status indicator, and wherein the master EMC is operative to perform functions comprising:
(a) receiving enclosure management data;
(b) detecting an operational status of each of the corresponding drive slots;
(c) generating drive slot status data indicating the detected operational status of each of the corresponding drive slots;
(d) receiving drive slot status data from the one or more slave EMCs in the computing system;
(e) based on the received enclosure management data, the generated drive slot data, and the received drive slot status data, generating mapped data for each one of the EMCs for selectively activating at least one drive slot status indicator to indicate the operational status of at least one of the drive slots; and
(f) sending the mapped data for each of the one or more slave EMCs to the corresponding slave EMCs, respectively.

13. The master EMC of claim 12, wherein the received enclosure management data including data associated with the one or more slave EMCs.

14. The master EMC of claim 12, further operative to receive drive slot status data via the first communications link from the one or more slave EMCs, the drive slot status data including a detected operational status of at least one drive slot of each of the one or more slave EMCs.

15. The master EMC of claim 12, wherein each of the drive slots is configured to be operatively coupled to a mass storage device.

16. The master EMC of claim 15, wherein the drive slot status data includes information associated with at least one of:
(a) the location of a mass storage device;
(b) whether a mass storage device is mated to the drive slot; and
(c) if a mass storage device is mated to the drive slot, whether the mated mass storage device is active.

17. The master EMC of claim 12, wherein at least one of the EMCs is communicatively connected to a storage controller configured to provide the enclosure management data to the EMCs, wherein the storage controller is configured to function as at least one of a host bus adapter (HBA), a redundant array of independent disks (RAID) controller, a serial advanced SCSI (SAS) controller, and a serial advanced technology attachment (SATA) controller.

18. The master EMC of claim 12, wherein the first communications link comprises a serial peripheral interface (SPI) bus.

19. The master EMC of claim 12, wherein generating the mapped data comprises generating mapped drive slot status data for each of the EMCs, and wherein the master EMC is further operative to communicate the enclosure management data with a baseboard management controller BMC over a second communications link configured for IPMI-IPMB communications.

20. A non-transitory computer-readable medium having stored thereon computer-executable instructions wherein the non-transitory computer-readable medium is provided in or communicatively connected to a computing system comprising a plurality of enclosure management controllers (EMCs) communicatively coupled to each other via a communications link and at least one storage controller configured to provide enclosure management data for controlling all of the drive slots for the EMCs, wherein each EMC is communicatively connected to a corresponding plurality of drive slots and at least one corresponding drive slot status indicator, wherein one of the EMCs is configured to function at least partly as a master EMC, and all of the EMCs not configured to function as the master EMCs are slave EMCs, and wherein the computer-executable instructions, when executed by a processor of the computing system, cause each EMC to perform functions comprising:
- (a) receiving enclosure management data;
- (b) detecting an operational status of each of the drive slots; and
- (c) generating drive slot status data indicating the detected operational status of each of the drive slots, and wherein the computer-executable instructions, when executed by the processor, cause the master EMC to further perform functions comprising:
- (d) receiving drive slot status data from the slave EMCs;
- (e) based on the received enclosure management data and all of the received drive slot status data, generating mapped data for each one of the EMCs for selectively activating at least one drive slot status indicator to indicate the operational status of at least one of the drive slots; and
- (f) sending the mapped data for each of the slave EMCs to the corresponding slave EMCs, respectively.

* * * * *